May 11, 1943. E. F. NELSON Re. 22,310
MECHANISM FOR BUTT-WELDING
Original Filed Oct. 7, 1938 2 Sheets-Sheet 1
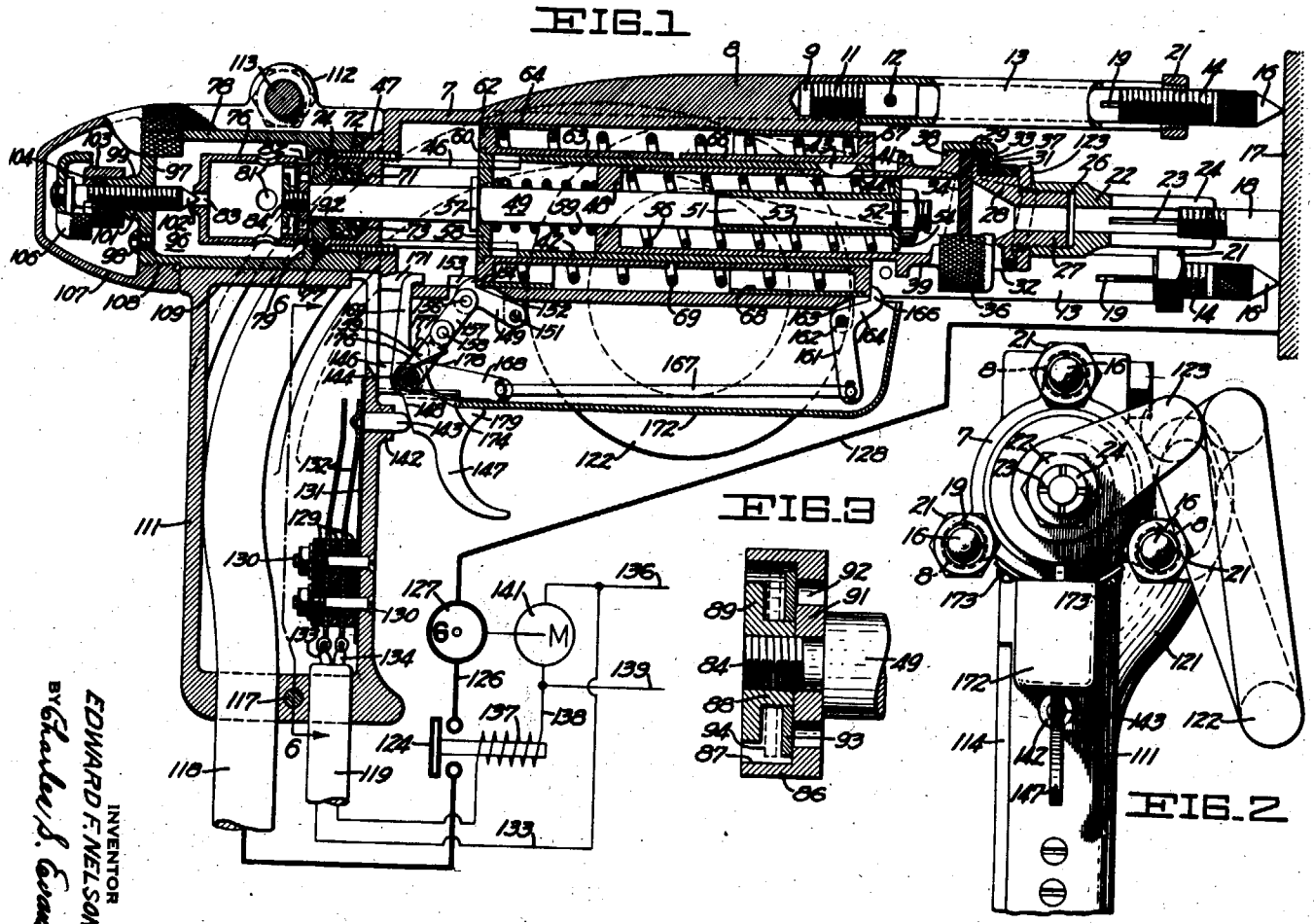
INVENTOR
EDWARD F. NELSON
BY Charles S. Evans
HIS ATTORNEY May 11, 1943. E. F. NELSON Re. 22,310
MECHANISM FOR BUTT-WELDING
Original Filed Oct. 7, 1938 2 Sheets-Sheet 2
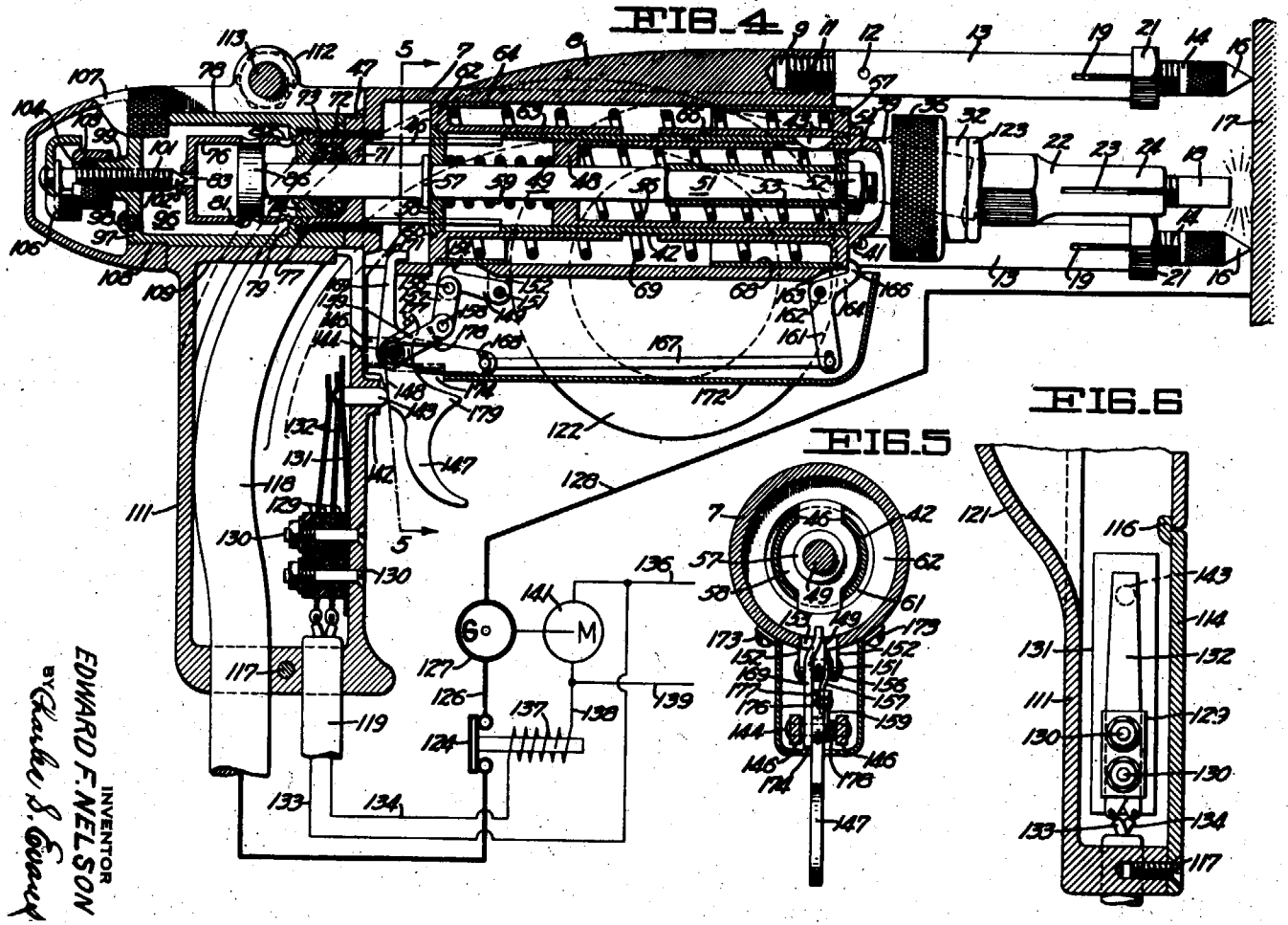
INVENTOR
EDWARD F. NELSON
BY Charles S. Evans
HIS ATTORNEY Reissued May 11, 1943 Re. 22,310

UNITED STATES PATENT OFFICE 22,310

MECHANISM FOR BUTT WELDING

Edward F. Nelson, Vallejo, Calif.

Original No. 2,217,964, dated October 15, 1940, Serial No. 233,872, October 7, 1938. Application for reissue July 25, 1942, Serial No. 452,348

20 Claims. (Cl. 219—4)

This invention relates to apparatus for electrically butt-welding metallic objects together and is an improvement over the structure shown in my prior application, Serial No. 217,345, filed July 5, 1938, for Stud welders since matured into Patent No. 2,191,494 dated February 27, 1940.

In the aforesaid application, electro-magnetic means, which required a source of current for energization, was utilized to actuate certain of the moving parts of the apparatus. In the present structure, such electro-magnetic means and its energization circuits are dispensed with and pressure means is substituted therefor which greatly simplifies the construction of the device, such simplification being one of the objects of this invention.

Another object of the invention is to provide, in mechanism of the class described wherein a reciprocable member is utilized, means for variably resisting movement of said member in one direction and for rendering said member capable of relatively unresisted movement in the opposite direction.

The invention possesses other objects and features of advantage which will be specifically set forth in the detailed description of the invention hereunto annexed. It is to be understood that the invention is not to be limited to the specific form thereof shown and described as various other embodiments thereof may be employed within the scope of the appended claims.

Referring to the drawings:

Figure 1 is a vertical sectional view taken in a plane passing medially and longitudinally through the mechanism of my invention. The various parts of the apparatus are shown in the positions they occupy just prior to the making of a weld.

Figure 2 is a front end elevational view of the structure illustrated in Figure 1. A portion of the view is omitted to shorten it.

Figure 3 is an enlarged vertical sectional view of the dashpot piston.

Figure 4 is a vertical sectional view, similar to Figure 1, showing some of the parts of the apparatus in the positions they occupy during the making of a weld.

Figure 5 is a vertical sectional view of the apparatus taken in the plane indicated by the line 5—5 of Figure 4.

Figure 6 is a vertical sectional view of that portion of the apparatus lying in and beyond the plane indicated by the line 6—6 of Figure 1.

In each of the Figures 1 and 4, the welding and control current sources are shown diagrammatically.

In detail, I provide a preferably cast metallic casing 7 having a plurality, preferably three, of radially projecting bosses 8 each being provided with threaded sockets 9 for the reception of studs 11 which are fastened in any suitable manner, such as by pin 12, into ends of tubular legs 13. The positioning of the bosses 8 is such that the legs 13 will be spaced apart equidistantly on a circle whose center is the longitudinal axis of the casing. The opposite end of each leg 13 is internally threaded to receive the threaded end of a foot 14 whose pointed end 16 may bear against the surface of a metallic member 17 to which a stud 18 or any such rod-like member is to be welded. The end of each leg, into which the feet 14 are threaded, is provided with a plurality of axially extending saw slots 19 and a nut 21, engaging tapered threads provided at the ends of the legs, is for the purpose of clamping the segments of the legs about the shanks of the feet 14 so that the latter, when adjusted to a desired position, may be frictionally locked in place. By means of the structure just described, the casing 7 may be accurately positioned in spaced relation to the surface of the member 17, it may be adjustably spaced by screwing the feet 14 into or out of the ends of the legs 13 or, by setting the feet at different degrees of extension and retraction, any angular position of the stud 18 with relation to the surface of the member 17 may be obtained.

Means is provided for supporting the stud 18 so that it may be moved in a pre-determined path away from and toward the surface of the member 17. Positioned centrally of the group of supporting legs 13, and in axial alinement with the axis of the casing 7, is a chuck 22 one end of which is centrally bored to form a socket which receives an end of the stud 18 and is provided with longitudinally extending slots 23 which form, at the end of the chuck, a plurality of resilient fingers 24 gripping the stud and frictionally retaining the latter in the socket. The opposite end of the chuck is provided with a threaded bore 26 in which the threaded shank 27 of a plug 28 is engaged. Surrounding the periphery of the plug 28 and having a skirt portion 29 which overlies a retaining flange 31 on the plug, is an insulating sleeve 32 provided on its outer periphery with a shoulder 33. An insulating disk 34 overlies the flanged end of the plug and surrounding the disk and on the sleeve 32 is a cap 36 having an annular lip 37 engaging the shoulder 33 of the sleeve and which is internally threaded and engaged with a flange 38 formed at one end of a tubular ram 39 so as to clamp the plug to the ram. The provision of the disk 34 and the sleeve 32 electrically insulates the stud and its supporting chuck from the ram and the remainder of the mechanism which will presently be described. The ram 39, which is provided with a limit flange 41 spaced from the flange 38, is mounted so as to freely slide axially of and within a stationary tube 42, the latter being provided with a fixed key 43 which operates in a slot 44 formed in the ram so that motion of the ram is confined to axial directions, the key 43 serving to prevent any rotational movement between the ram and the tube. The limit flange 41 is for the purpose of restricting the axial movement of the ram to approximately one-fourth of an inch so that a gap of this dimension may be established between the end of the stud 18 and the surface of the member 17. The opposite end of the tube 39 is provided with a pair of axially extending diametrically opposed slots 46, best shown in Figure 5, and is externally threaded to engage the threads in the bore of a hub 47 formed at the end of the casing 7. This mounts the tube in fixed relation and concentric with the casing.

Disposed concentrically within the tube, and slidable axially relative thereto through an aperture provided in the tube end wall 48, is a rod 49 having at one end thereof a diametrically reduced portion 51 on which is fixedly mounted by a nut 52 a ferrule 53 provided with a radially extending flange 54. A coil spring 56 surrounds the rod and the ferrule 53 and has its ends engaging the tube end wall 48 and the ferrule flange 54 respectively. The opposite end of the rod extends through and slightly beyond the slotted end of the tube 42 and intermediate the ends of the rod is provided a collar 57 which engages, as is best shown in Figure 5, a cross bar 58 extending transversely of the tube and passing through the opposed slots 46 thereof. A coil spring 59 engaging the cross bar and the end wall 48 of the plunger serves to resiliently maintain the cross bar against the collar 57. The cross bar, since it is connected to the rod by the collar is movable axially of the tube when the rod is moved. The distal ends of the cross bar are each provided with segmental arcuate flanges 60 which seat in a circular recess 61 formed in the flange 62 of a sleeve 63 which is slidably mounted on the tube 42 and on the periphery of the sleeve flange is pressed, or otherwise suitably secured, a relatively short tubular skirt 64. A similar sleeve 66 is provided at and slidably mounted on the other end of the tube 42 and has a flange 67 to the periphery of which, and extending within the bore of the case 7, is a tubular skirt 68. A coil spring 69 surrounds both sleeves 63 and 66 and has its ends bearing against the sleeve flanges 62 and 67 respectively. Both sleeves are capable of independent sliding motion along the tube 42 one, as mentioned above, being movable as the rod 49 is moved and the other being movable, within certain limits, into and out of the open end of the bore of the casing 7.

Positioned at the slotted end of the tube 42 is a group of members comprising a plug 71, which has therein a central bore through which the rod 49 slidably passes and a concentric counterbore 72 in which packing material 73 engaging the periphery of the rod is placed, a packing gland closure disk 74 also having a central bore therein through which the rod slidably passes and a cylindrical extension entering the counterbore 72 for the purpose of compressing the packing material 73 about the shaft, and a dashpot cylinder 76 which is axially alined with the rod 49. The plug 71, closure disk 74 and dashpot cylinder 76 each is provided with a peripheral flange 77 lying contiguous with the others and with the end of the tube 42 and a hollow cylindrical housing 78 having a threaded bore portion which engages the threaded end of the tube 42 has therein a flange 79 engaging the flanges 77 so as to clamp the members 71, 74 and 76 as a unit to the tube. The dashpot cylinder has therein axially spaced groups of fluid inlet ports 81 and 82 and at one end is provided with a fluid outlet opening 83. The end of the rod 49 extends into the dashpot cylinder and, as is best shown in Figure 3, is provided with a threaded shank 84 upon which is mounted a cylindrical piston 86 provided with an axial counterbore 87. A nut 88, which is threaded on the shank 84 and is provided with a peripheral flange 89 spaced from the end wall 91 of the piston, serves to fixedly secure the piston on the rod 49. The end wall 91 of the piston is pierced by a plurality of apertures 92 and a disk valve 93, movable from a position wherein it overlies and closes the apertures 92 to a position indicated by the dotted lines 94 wherein the apertures are open, is slidably mounted on the nut 88 the flange 89 of the latter serving as a stop to limit the degree of movement of the disk valve away from the piston end wall 91. Fluid, preferably light oil, is admitted to fill the reservoir 96 formed by the hollow interior of the housing 78, through a filling opening provided in the end wall 97 of the housing and closed by a threaded plug or screw 98. The oil filling the reservoir will, of course, also fill the cylinder 76 since it may flow thereinto through the inlet openings 81. When the piston moves in the cylinder from right to left, as viewed in Figure 1 or 4, some of the oil in the cylinder will be forced by the advancing piston back through the inlet openings 81 into the reservoir and through the openings 82 into the space in back of the piston thus equalizing the pressure on both sides of the piston and permitting free and substantially unrestricted movement thereof during approximately the first one-fourth inch of travel of the latter. As the piston progresses the periphery thereof will traverse and close the inlet openings 81 thereby causing the oil remaining in the cylinder to flow through the vent opening 83. After the piston has closed the openings 81, no oil may flow through the piston apertures 92 since the latter are tightly closed by the disk valve 93 which is forced against the piston end wall by the pressure of the oil being driven through the vent opening 83. However, upon a reversal of movement of the piston, the disk valve will be forced open thereby allowing the oil to by-pass through the piston and permitting the recovery movement thereof to be made more quickly.

Means is provided for variably obstructing the vent opening 83 so that the interval of time that it takes the piston to travel from one end of the cylinder to that containing the vent opening 83 may be lengthened or shortened as desired. Formed concentrically of the housing end wall 97 and in axial alinement with the vent opening 83 is a hub 99 centrally bored and threaded to receive the threaded stem 101 of a pointed needle valve 102. The periphery of the hub 99 is threaded to receive an internally threaded tubular nut 103 which compresses packing 104 about the needle valve stem 101 so as to prevent escape of oil from the reservoir 96 past the threads of the stem. A hand wheel 106, riveted or otherwise secured to the stem, is provided for manually rotating the stem so that various degrees of setting of the needle valve may be secured and a cap 107 which engages external threads 108 on the housing 78 is provided for enclosing and protecting the valve adjusting handwheel against accidental disturbance.

Surrounding the housing 78 is the tubular head portion 109 of a handle 111 which extends radially downwardly from the housing. The head portion 109 is split longitudinally and provided with lugs 112 each apertured to receive a bolt 113 which clamps the head portion of the handle to the housing. The handle is hollow and, as is best shown in Figure 6, is provided with a side opening closed by a cover plate 114. The cover plate is designed for ready detachment so as to allow for the insertion or removal of portions of the apparatus contained within the handle, the upper end thereof having an offset lug 116 adapted to pass through the opening and engage the inner surface of the wall of the handle and the bottom end thereof being attached to the body of the handle by a removable screw 117. The bottom of the handle is provided with a pair of apertures through which pass, respectively, a welding current cable 118 and a control current cable 119. The cable 118 extends upwardly through the handle and passes through a hollow boss 121 projecting from one side of the handle. The cable, after emerging from the boss 121, is provided with a loop 122 and is attached to a connector lug 123 which is clamped between the chuck 22 and the plug 28. The purpose of the loop 122 is to provide for a greater flexibility than the cable normally possesses so that free movement of the chuck and stud 18 toward and away from the surface of the member 17 will not be hindered. The other end of the cable 118 is connected to one terminal of a relay or circuit breaker 124, the other terminal of which is connected by a lead 126 to an output terminal of a generator or other source of welding current 127. A lead 128 connects the other output terminal of the welding current source with the member 17. Disposed within the handle 111 and electrically insulated therefrom by insulating blocks 129 mounted on the handle by screws 130 and by a flexible insulating strip 131, is a pair of flexible metallic blades 132 which, in their normal positions, as is shown in Figure 1, are spaced apart at their free ends. One each of the conductors 133 and 134 in the cable 119 are connected to the respective blades 132, the former conductor being also connected to a lead 136 from a current source and the conductor 134 being connected to one end of the relay actuating coil 137. The other end of the actuating coil is connected by a conductor 138 to another lead 139 from the current source. The leads 136 and 139 may be conveniently connected to the motor 141 which drives the welding current generator. While I have illustrated a conventional motor-generator for supplying the welding current, it is to be understood that any type of apparatus for producing the current may be utilized without departing from the spirit of the invention and that the control current for operating the circuit breaker may be obtained from an auxiliary generator in the case of a welding unit driven by motors powered other than electrically.

Means is provided for manually closing the control circuit switch composed of the contact blades 132. In the side wall of the handle 111, and positioned adjacent the distal end of the switch blades, is a boss 142 which is centrally bored to slidably receive a pushbutton 143 normally extending outwardly a distance beyond the end of the boss. One end of the pushbutton engages the insulating strip 131. Mounted for pivotal movement on and depending from a pivot pin 144 carried by a pair of spaced brackets 146, formed integrally with the handle and projecting therefrom above the boss 142, is a trigger 147 having a side portion 148 thereof engaging the projecting end of the pushbutton 143. By manually pulling the trigger so as to move it about its pivot toward the handle the pushbutton will be moved axially of the bore of the boss 142 and the switch blade 132 lying closest to the handle side wall will be flexed to contact the other switch blade as is clearly shown in Figure 4. Closing of the switch by the trigger 147 causes current to flow through the relay actuating coil 137 thereby closing the relay contacts and establishing the welding current circuit from the generator 127 to the stud 18 and to the member 17.

Means is provided for plurally latching parts of the apparatus operatively connected with the spring 69 against movement, and to maintain the spring under compression, and means is provided for successively releasing said latches to release and allow extension of the spring. One of these latches comprises a lever 149 pivotally mounted on a pin 151 carried by a spaced pair of brackets 152 depending from the casing 7, so that its free end may move into and out of an aperture 153 formed in the casing side wall. At the free end of the lever 149 is formed a latch dog 154 adapted to rest, when the rod 49 is at the extreme limit of its travel to the right, as viewed in Figure 1, against an end of the sleeve 63. The free end of the lever 149 is also provided with a pin 156 to which is pivotally connected one end of a coupling link 157, the other end of the latter being connected by a pivot pin 158 to one end of a link 159 which is pivotally mounted on the trigger pivot pin 144. It will be seen that, when the links 157 and 159 are in the position in which they are shown in Figure 1 and the latch dog 154 is engaging the end of the sleeve 63, the sleeve will be prevented from movement toward the left. The other of the latches comprises a lever 161 pivotally mounted on and depending from a pivot pin 162 which is carried by spaced brackets 163 provided adjacent the forward end of the casing 7. The lever 161 has thereon an extension 164 at the end of which is formed a latch dog 166 which may swing into engagement with an end of the sleeve 66 so as to prevent movement of the latter to the right, as viewed in Figure 1. The lower end of the lever 161 is connected by a connecting rod 167 to the end of one arm 168 of a bell crank pivotally mounted on the trigger pivot pin 144, the other arm 169 of the bell crank passing upwardly and into the bore of the casing 7 through an opening 171 formed in the side wall thereof. The distal end of the arm 169 lies in the path of movement of the sleeve 63 along the casing bore. A guard cover 172, secured to the casing by screws 173, encloses all of the links and levers just described with the exception of the trigger 147 which projects through an opening 174 formed in the cover. The cover, besides protecting the latch mechanism against being accidentally disturbed, conveniently serves as a stop to limit movement of certain of the levers. Extending upwardly from the trigger, adjacent the pivot pin 144 thereof, is a short arm 176 provided at its end with a spur 177 which contacts an edge of the link 159, and a torsion spring 178 surrounding the pivot pin 144 has one end thereof engaging the opposite edge of the link 159 and the other end thereof resting against the inner bottom surface of the cover 172. This spring urges the link 159 upwardly to contact the spur 177 which is prevented from further movement by an extension 179 of the trigger which engages the outer surface of the cover 172. The arrangement of the parts is such that when the latch dog 154 is engaged with the end of the the sleeve 63, as shown in Figure 1, the axis of the pivot pin 158 will coincide with a straight line passing through the other pivot pins 156 and 144. When such a condition obtains, the lever 149 will be locked against movement irrespective of the pressure that may be exerted by the sleeve 63 against the latch dog 154. Similarly, when the end of the bell crank arm 168 rests against the inner bottom surface of the cover 172, the axis of the portion of the connecting rod 167 that connects with the pivot arm will rest below a plane passing through the opposite end of the connecting rod and the axis of the trigger pivot pin 144 with the result that the latch lever 161 is locked in position since any force exerted by the sleeve 66 to move the latch lever will be counteracted because the bell crank lever is in engagement with the fixed cover 172. However, when pressure is applied to the trigger to move the latter toward the position shown in Figure 4, the spur 177 will press against the edge of the link 159 causing the latter to swing downwardly about the pivot pin 144. As soon as the axis of the pivot pin 158 passes out of coincidence with the above-mentioned line passing through the pivot pins, the latch lever 149 will be freed and will then swing, under influence of pressure from the sleeve 63 advancing along the casing bore, downwardly, folding the links 157 and 159 as it moves, until the latch dog 153 has cleared the sleeve thereby allowing the sleeve to pass over and past the dog, the latch lever being thereafter held down by the skirt 64. Continued movement of the sleeve 63 will cause the latter to contact the end of the lever arm 169 thereby causing upward movement of the lever arm 168 about the pivot pin 144 until the pivot of the connecting rod 167 at the end of the arm 168 passes through and above the plane passing through the axes of the pivot pin 144 and the opposite end of the connecting rod where the latter connects with the latch lever 161, whereupon the latter latch lever will be released allowing the sleeve 66 to move out of the end of the casing and over and past the latch dog 166.

In describing the cycle of operation of the apparatus, it will be well to first describe, in general terms, how the welding of the stud 18 to the surface of the metallic member 17 is accomplished. The stud, as was described above, forms one electrode of the welding circuit and the member 17 forms the other electrode. The operation starts with the end of the stud held against and in contact with the surface of the member 17. The welding circuit is then energized and the stud is drawn away from the member to create an arc therebetween which in a short time will bring the metals of the stud and member to the melting point. Just as soon as the critical point is reached, the molten end of the stud is plunged against the melted area of the member, the current is turned off, and the resulting weld is allowed to congeal.

Describing the operation in terms of structure, the apparatus must first be "cocked" manually before it is in condition to perform, that is, after a stud 18 has been inserted in the chuck, the operator must grasp the chuck and draw it outwardly away from the casing 7. This moves the dashpot piston toward the extreme right end of the cylinder and brings the end of the sleeve 63 to its position of engagement with the dog of the latch lever 149. After the sleeve 63 has been latched, which will be indicated by the audible click of the latch dog snapping into place, the operator must push the chuck toward the casing 7. This moves the sleeve 66 into the casing bore until the latch dog 166 snaps behind the end of the sleeve, whereupon the latter will be held in this position, and simultaneously compresses the spring 69. The operator now releases the chuck which will, under the influence of the spring 59, return to its normal position wherein the limit flange 41 is spaced approximately one-fourth inch from the end of the tube 42. The operator now grasps the handle 111 and holds the apparatus so that the three pointed feet 16 rest against the surface of the member 17 and the end of the stud 18 is positioned on the spot to which it is desired that the stud be welded. The operator now presses the trigger 147 and maintains it in depressed position. This action first moves the pushbutton 143 to close the control circuit switch blades 132 which closes the welding current relay 124 thereby sending current through the stud and the member 17 and, secondly, trips the latch lever 149 which frees the sleeve 63. The pressure of the spring 69 immediately causes the sleeve to move toward the left-hand end of the casing 7 and, as was explained above, since the dashpot piston may move freely until it covers the inlet ports 81, the chuck will be suddenly moved toward the casing until the limit flange 41 impinges against the end of the tube 42 whereupon further motion of the chuck is arrested. This, immediately following the institution of current flow in the welding circuit, establishes a gap between the end of the stud and the surface of the member 17 resulting in the formation of an electric arc between the two elements as is shown in Figure 4. The sleeve 63, continuing to move under the pressure of the spring 69 after its rapid motion to establish the arc gap, now encounters resistance since the piston has passed over the dashpot inlet openings 81 and must force the oil entrapped in the cylinder through the restricted vent opening 83 thereof. This retarded motion of the sleeve continues until the latter engages the end of the bell crank arm 169 whereupon the bell crank will be moved about the pivot pin 144 until, as explained above, the latch lever dog 166 releases the sleeve 66 which, under the pressure remaining in the spring 69, will forcibly project the latter sleeve and the chuck toward the member 17 thereby plunging the molten end of the stud into the arc crater in the member 17. As soon as the operator sees that the stud and the member are joined, he releases the trigger which allows the relay 124 to open and disrupts the welding circuit. The interval of time elapsing between the creation of the welding arc and the joining of the heated members depends, of course, on the amount of welding current used and, in practice, does not exceed a few seconds, therefore the setting of the needle valve 102 must be obtained by trial so as to provide the proper timing between the release of the latch lever 149 and that of the latch lever 164.

It will be seen from the foregoing description of my invention that I have provided welding apparatus of the character described which is capable of joining studs or other rod-like members to the surfaces of metallic objects and of producing accurately uniform welds, which accurately positions each of the studs relative to the object to which it is to be joined, which accurately times the duration of each welding operation, which is fool-proof in that the adjustments when once made may not be readily or accidentally disturbed, which is light in weight, and which possesses a minimum of intricate and delicate parts which are likely to get out of order.

I claim:

1. Apparatus of the class described comprising a casing, means on said casing for engaging the surface of a metallic member forming one electrode of an electric welding circuit so as to position said casing above said surface, means mounted for movement in said casing and for supporting a metallic element forming another electrode of said welding circuit whereby said element may be moved from and toward and to contact said surface of the metallic member, and pressure means in said casing and operatively connected with said element supporting means for moving said element supporting means and said element, first, in a direction away from the surface of said member whereby an electric arc is struck between the element and the member and, secondly, for moving said element supporting means and said element toward and to contact said surface of said member.

2. Apparatus of the class described comprising a casing, a plurality of legs carried by said casing for engaging the surface of a metallic member forming one electrode of an electric welding circuit so as to position said casing above said surface, a ram mounted in said casing for movement from and toward the surface of said member, means for supporting on said ram a metallic element forming another electrode of said electric welding circuit whereby, when said element is moved away from the surface of said member, an electric arc may be established between the element and the member, an expansible spring operatively connected with said ram, said spring being normally compressed and held at each end against expansion, means for releasing one end of said spring to move said ram and the element carried thereby away from the surface of said member, and means for releasing the other end of said spring to move the ram and element toward and to contact said surface of the member.

3. Apparatus of the class described comprising a casing, a plurality of legs carried by said casing for engaging the surface of a metallic member forming one electrode of an electric welding circuit so as to position said casing above said surface, a ram mounted in said casing for movement from and toward the surface of said member, means for supporting on said ram a metallic element forming another electrode of said electric welding circuit whereby, when said element is moved away from the surface of said member, an electric arc may be established between the element and the member, a pair of sleeves slidably mounted in said casing for movement relative to each other and concentric with said ram, an expansible spring connected at its respective ends to the respective sleeves, separate releasable means for holding said sleeves against movement and for maintaining said spring under compression, separate means operatively connecting said sleeves and said ram for movement together, means for releasing one of said sleeves to move said ram in a direction away from the surface of said member, and means operative upon movement of said first sleeve for releasing the other of said sleeves to move said ram in a direction toward the surface of said member.

4. Apparatus of the class described comprising a casing, a plurality of legs carried by said casing for engaging the surface of a metallic member forming one electrode of an electric welding circuit so as to position said casing above said surface, a ram mounted in said casing for movement from and toward the surface of said member, means for supporting on said ram a metallic element forming another electrode of said electric welding circuit whereby, when said element is moved away from the surface of said member, an electric arc may be established between the element and the member, a cylinder in said casing having an outlet opening and a plurality of inlet openings through which a fluid may enter said cylinder, a rod connected and movable with said ram and entering said cylinder, a piston on said rod disposed within said cylinder, said piston being movable along said cylinder when said ram is moved to pass over and close said inlet openings and to force the fluid in said cylinder through said outlet opening, means for variably obstructing the flow of fluid through said outlet opening, a pair of sleeves slidably mounted in said casing for movement relative to each other and concentric with said ram, an expansible spring interposed between and connected with said sleeves, separate releasable latches mounted on said casing and operatively connected respectively with the respective sleeves for holding the latter against movement and for maintaining said spring under compression, means connecting the separate sleeves with said ram, manually operable means for releasing one of said latches to release the sleeve held thereby, the spring whereby the latter may move the ram in a direction away from the surface of said member, and the rod whereby the piston is moved in said cylinder to force the fluid contained in the cylinder through the outlet opening thereof, and separate means for releasing the other of said latches whereby the other sleeve is released to be moved together with the ram connected thereto in a direction toward the surface of said member so that the said surface and the said element will be brought into contact with each other.

5. Apparatus of the class described comprising a casing having an axial bore therein, a plurality of legs carried by said casing for engaging the surface of a metallic member forming one electrode of an electric welding circuit so as to position said casing above said surface, feet carried by each of said legs and extensible relative thereto whereby the spacing between the surface of said member and said casing may be adjustably varied, a tube fixed in and extending axially of said casing within the bore thereof, a ram slidably mounted in said tube and extending from an end of the latter, said ram having a chuck thereon for carrying a metallic element forming another electrode of said electric welding circuit and to be welded to said metallic member, a hollow cylinder in said casing and axially alined with said tube, said cylinder having at one end thereof an outlet opening and a plurality of inlet openings, spaced from said outlet opening, through which a fluid may be admitted into said cylinder, a rod connected with said ram and extending axially of said tube into said cylinder, a piston on said rod within said cylinder, said piston being movable, when said ram is moved, along said cylinder across and to close said inlet openings thereof and to force fluid contained in said cylinder through the outlet opening thereof, means for variably obstructing flow of fluid through said outlet opening whereby the movement of said piston in said cylinder is resisted, a pair of separate sleeves slidably mounted on said tube, an expansible spring surrounding said tube and engaged at its ends with the respective sleeves whereby said sleeves may be moved by expansion of said spring in opposite directions along said tube, means connecting a first sleeve with said rod whereby said rod, said ram and the element carried by the ram may be moved axially of the tube in a direction away from the surface of said member when said first sleeve is moved, means extending from said ram and disposed in the path of movement of a second sleeve along said tube and engageable by said second sleeve whereby said ram and said element carried thereby may be moved, upon movement of said sleeve, in a direction toward said member so that said element and said member are brought into contact, a first latch lever pivotally mounted on said casing and having a dog thereon engaging said first sleeve to hold the latter against movement, means for latching said first latch lever in position to hold said lever against movement to release said first sleeve, a second latch lever pivotally mounted on said casing and having a dog engaging said second sleeve for holding said second sleeve against movement whereby said spring is maintained under compression, and means for successively releasing said first latch and said second latch.

6. Apparatus for welding a first member forming a fixed electrode of an electric welding circuit to a second member forming another electrode of said welding cricuit, comprising a support, said second member being mounted on said support and movable from and toward said first member, and unitary means for moving said second member relative to said first member, primarily, in a direction away from the first member to establish an arc gap between said members and, secondarily, in a direction toward said first member to close said arc gap.

7. Apparatus for welding a first member forming a fixed electrode of an electric welding circuit to a second member forming another electrode of said welding circuit, comprising a support, said second member being mounted on said support and movable along a defined path from and toward said first member, and a compressed element operatively connected with said second member and expansible in opposite directions parallel to said path of movement of the second member for, primarily, moving said second member in a direction away from the first member to establish an arc gap between said members and for, secondarily, moving said second member toward said first member to close said arc gap.

8. Apparatus for welding a first member forming a fixed electrode of an electric welding circuit to a second member forming another electrode of said welding circuit, comprising a support, said second member being mounted on said support and movable along a defined path from and toward said first member, an element operatively connected with said second member and expansible in opposite directions parallel to said path of movement of the second member, releasable first and second restraining means engaging opposite ends of said expansible element for holding said element in compression against expansion in said opposite directions, means for releasing said first restraining means to release one end of said expansible element and to move said second member in a direction away from said first member to establish an arc gap between said member, and means for releasing said second restraining means for releasing the opposite end of said expansible element and to move said second member toward said first member to close said arc gap.

9. Apparatus for welding a first member forming a fixed electrode of an electric welding circuit to a second member forming another electrode of said welding circuit, comprising a support, said second member being mounted on said support and movable along a defined path from and toward said first member, an element operatively connected with said second member and expansible in opposite directions parallel to said path of movement of the second member, releasable first and second restraining means engaging opposite ends of said expansible element for holding said element in compression against expansion in said opposite directions, means for releasing said first restraining means to release one end of said expansible element and to move said second member in a direction away from said first member to establish an arc gap between said member, means for releasing said second restraining means for releasing the opposite end of said expansible element and to move said second member toward said first member to close said arc gap, and means for yieldably resisting movement of said expansible element during said movement thereof to establish said arc gap between said first and second members.

10. Apparatus for welding a first member forming a fixed electrode of an electric welding circuit to a second member forming another electrode of said welding circuit, comprising a support, said second member being mounted on said support and movable along a defined path from and toward said first member, an element operatively connected with said second member and expansible in opposite directions parallel to said path of movement of the second member, releasable first and second restraining means engaging opposite ends of said expansible element for holding said element in compression against expansion in said opposite directions, means for releasing said first restraining means to release one end of said expansible element and to move said second member in a direction away from said first member to establish an arc gap between said member, means for releasing said second restraining means for releasing the opposite end of said expansible element and to move said second member toward said first member to close said arc gap, and means for adjustably varying the resistance of said expansible element resisting means.

11. Apparatus for welding a first member forming a fixed electrode of an electric welding circuit to a second member forming another electrode of said welding circuit, comprising a support, said second member being mounted on said support and movable along a defined path from and toward said first member, a compressed element operatively connected and movable with said second member and expansible in opposite directions parallel to said path of movement of the second member, means for releasing said expansible element for primary movement and to move said second member in a direction away from the first member to establish an arc gap between said member, and means operable by said primary movement of said expansible means at the expiration of a predetermined interval of time after institution of said primary movement for releasing said expansible means for secondary movement and to move said second member in a direction toward said first member to close said arc gap.

12. In a welding apparatus, a casing, a ram slidably mounted in said casing, a spring for moving the ram axially in either direction, a pair of latches for restraining the action of the spring, means for releasing one of the latches to permit the spring to move the ram in one direction, and time controlled means initiated by the releasing means for releasing the other latch to permit the spring to move the ram in the other direction.

13. In a welding apparatus, a casing, a ram slidably mounted in said casing, a spring for moving the ram axially in either direction, a pair of latches for restraining the action of the spring, manually actuated means for closing the welding circuit and for releasing one of the latches to permit the spring to move the ram in one direction, and time controlled means initiated by the releasing means for releasing the other latch to permit the spring to move the ram in the other direction.

14. In a welding apparatus, a casing, a ram slidably mounted in said casing, a spring for moving the ram axially in either direction, a pair of latches for restraining the action of the spring, a switch for controlling the welding circuit, manually controlled means for operating the switch and for releasing one of the latches to permit the spring to move the ram in one direction, and time controlled means initiated by the releasing means for releasing the other latch to permit the spring to move the ram in the other direction.

15. In a welding apparatus, a casing, a ram slidably mounted in said casing, first and second push rings slidably mounted in said casing and operatively connected to said ram, a power spring between the push rings, time controlled means for limiting the movement of the first push ring, a latch for restraining movement of each push ring, manually operated means for releasing the latch of the first push ring, and means operated by the first push ring for releasing the latch of the second push ring.

16. In a welding apparatus, a casing, a ram slidably mounted in said casing, first and second push rings slidably mounted in said casing, the first push ring being resiliently connected to the ram for moving the ram in one direction and the second push ring being arranged to move the ram in the other direction, time controlled means for limiting the movement of the first push ring, means for limiting the associated movement of the ram, a power spring between the push rings, a latch for restraining movement of each push ring, manually operated means for releasing the latch of the first push ring, and means operated by the first push ring for releasing the latch of the second push ring.

17. In a welding apparatus, a casing including a centrally disposed hollow stud, a ram slidably mounted in the stud, first and second push rings slidably mounted on the stud, the first push ring being resiliently connected to the ram for moving the ram in one direction and the second push ring being arranged to move the ram in the other direction, time controlled means for limiting the movement of the first push ring, means for limiting the associated movement of the ram, a power spring between the push rings, a latch for restraining movement of each push ring, manually operated means for releasing the latch of the first push ring, and means operated by the first push ring for releasing the latch of the second push ring.

18. In a welding apparatus, a casing, a ram slidably mounted in said casing, first and second push rings slidably mounted in said casing and operatively connected to said ram, a power spring between the push rings, time controlled means for limiting the movement of the first push ring, a latch for restraining movement of each push ring, manually operated means for releasing the latch of the first push ring, means operated by the first push ring for releasing the latch of the second push ring, and means acting in time with the manually operated means for closing the welding circuit.

19. In an apparatus for welding a stud to a plate, a casing, a ram including means for holding a stud and slidably mounted in the casing, a single power spring for moving the ram in either direction, first and second latches for controlling the application of the spring to the ram, manually operated means for releasing the first latch to allow the spring to move the ram to separate the stud from the plate, and time controlled means acting in time with the manually operated releasing means for releasing the second latch to allow the spring to move the ram to engage the stud with the plate.

20. In an apparatus for welding a stud to a plate, a casing, a ram including means for holding a stud and slidably mounted in the casing, a single power spring for moving the ram in either direction, first and second latches for controlling the application of the spring to the ram, manually operated means for releasing the first latch to allow the spring to move the ram to separate the stud from the plate, time controlled means initiated by the manually operated releasing means for releasing the second latch to allow the spring to move the ram to engage the stud with the plate, and means acting in time with the manually operated means for closing the welding circuit.

EDWARD F. NELSON.